(12) United States Patent
Lin

(10) Patent No.: US 9,142,009 B2
(45) Date of Patent: Sep. 22, 2015

(54) PATCH-BASED, LOCALLY CONTENT-ADAPTIVE IMAGE AND VIDEO SHARPENING

(71) Applicant: Adobe Systems Incorporated, San Jose, CA (US)

(72) Inventor: Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/954,112

(22) Filed: Jul. 30, 2013

(65) Prior Publication Data

US 2015/0036943 A1 Feb. 5, 2015

(51) Int. Cl.
*G06K 9/40* (2006.01)
*G06T 5/00* (2006.01)

(52) U.S. Cl.
CPC ....... *G06T 5/003* (2013.01); *G06T 2207/20182* (2013.01)

(58) Field of Classification Search
None
See application file for complete search history.

(56) References Cited

U.S. PATENT DOCUMENTS 7,643,698 B2 * 1/2010 Reid ............................. 382/263
8,867,858 B2 * 10/2014 Fattal et al. ................... 382/264

* cited by examiner

*Primary Examiner* — Bhavesh Mehta
*Assistant Examiner* — Feng Niu
(74) *Attorney, Agent, or Firm* — Kilpatrick Townsend & Stockton LLP

(57) ABSTRACT

Techniques for sharpening an image using local spatial adaptation and/or patch-based image processing. An image can be sharpened by creating a high-frequency image and then combining that high frequency image with the image. This process can be applied iteratively by using the output of one iteration, i.e., the sharpened image, as the input to the next iteration. Using local spatial adaptation and/or patch-based techniques can provide various advantages. How to change the intensity at a given position in the image can be calculated from more than just information about that same position in the input image and the blurred image. By using information about neighboring positions an improved high frequency image can be determined that, when combined with the input image, reduces ringing and halo artifacts, suppresses noise boosting, and/or generates results with sharper and cleaner edges and details.

22 Claims, 13 Drawing Sheets

PATCH-BASED, LOCALLY CONTENT-ADAPTIVE IMAGE AND VIDEO SHARPENING

TECHNICAL FIELD

This disclosure relates generally to computer-implemented methods and systems for altering image and video content and more particularly relates to sharpening image and video content.

BACKGROUND

Static or video images captured under low-light conditions and other circumstances are often noisy and blurry due to their camera sensor limitations and the hand-held nature of the camera. Various computer-implemented techniques are used to improve the appearance of such images. For example, algorithms used within image editing software can be used to change the color, brightness, etc. of the pixels of an image. Image editors use algorithms to add or remove noise from an image, remove unwanted elements, selectively change colors, change image orientation, distort or transform the shape of an image, correct images for lens distortions, make the image lighter or darker, change contrast, apply filters, merge images, change color depth, change contrast and brightness, etc.

Image editors can sharpen images in a number of ways. Image sharpening can involve reducing uniform blur or motion blur, increasing local contrast, and/or boosting image details. Uniform blur is typically Gaussian or lens blurs which is represented as 2D symmetric point spread functions (PSF). Motion blurs are typically caused by either camera shake and/or independent moving objects (e.g. people) which is represented by a 2D non-symmetric, sparse PSF.

One existing image sharpening technique is known as unsharp masking. The unsharp masking technique is used by many image processing software applications. Unsharp masking involves blurring an input image, computing a high-frequency image by subtracting the blurred image from the original image, and combining the high-frequency image linearly based on a weight (i.e., a sharpen strength) with the original image. These operations are performed globally on the image as a whole and generally improve contrast in the image. However, halo artifacts and ringing can occur as a result of the unsharp masking techniques. Another existing image sharpening technique is known as smart sharpen. Smart sharpen is an iterative extension of unsharp masking that involves feeding the result of each sharpen iteration to the input of the next iteration. This can make the sharpen result more accurate. However, it can exacerbate halo and ringing artifact and increase noise in the image. Unsharp masking and smart sharpen are applied globally and have no noise suppression capability. These techniques often bring up compression artifacts and noise with the sharpening results, and create halo and ringing artifacts around edges even if the input blur kernel is correct.

SUMMARY

One embodiment involves applying a blur kernel to an input image to obtain a blurred image. The embodiment further involves determining differences between the input image and the blurred image, wherein a difference of the determined differences is determined based on an input image patch in the input image and a blurred image patch in the blurred image, wherein the input image patch and the blurred image patch are not located at corresponding locations in the input image and blurred image. This may involve identifying the blurred image patch by searching, in a local neighborhood in the blurred image around a location corresponding to the input image patch, for a patch most similar to the input image patch. This exemplary embodiment further involves sharpening the input image using the determined differences between the input image and the blurred image.

Another exemplary embodiment involves applying a blur kernel to an input image to obtain a blurred image. The embodiment further involves computing patch updates using the blurred image, wherein each of the patch updates is computed for a respective patch of the input image. The embodiment further involves accumulating the patch updates to a high frequency image and computing a sharpened image using the high frequency image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Introduction

Figure 1:
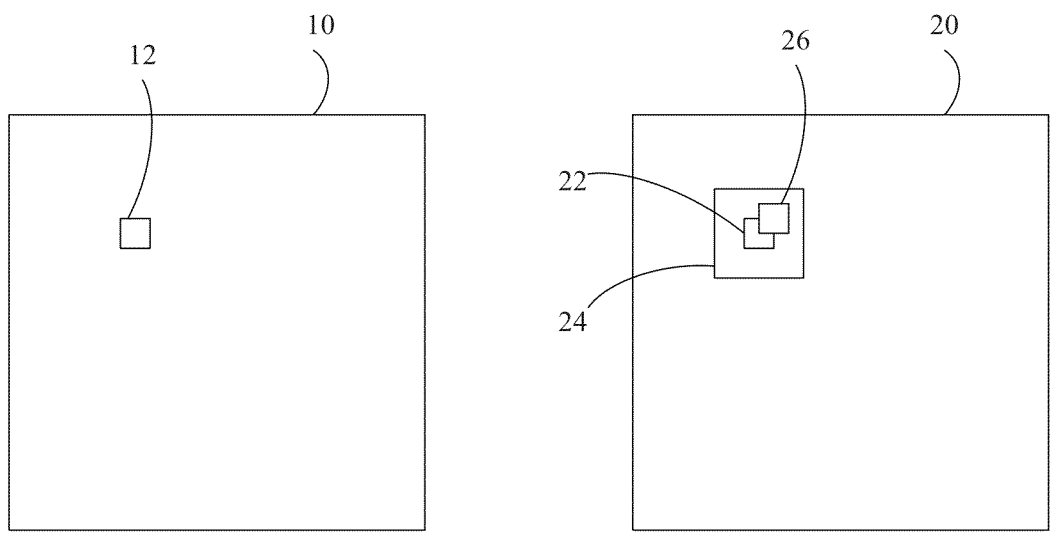
FIG. 1 is a modeling diagram depicting an exemplary local patch search technique.

Computer-implemented systems and methods are disclosed for sharpening an image using local spatial adaptation processing. An image can be sharpened by creating a high-frequency image from the image that is to be sharpened and then combining that high frequency image with the image that is to be sharpened. The process can be applied iteratively by using the output of one iteration, i.e., the sharpened image, as the input to the next iteration. The phrase "high-frequency image" refers to an image in which intensity data changes rapidly on a short distance scale across the image. Creating a high-frequency image can involve applying an algorithm or other process to a first image to create a second image that represents the rapid changes in intensity across the first image.

Sharpening the image can involve local spatial adaptation. The phrase "local spatial adaptation" refers to adjusting a portion of an image based on nearby portions of the image or of other images used in the sharpening process. In one embodiment that involves local spatial adaptation, a high frequency image that is used to sharpen an original image can include portions that are calculated from more than just information about corresponding positions in the input image and the blurred image. By using information about neighboring positions, an improved high frequency image can be determined that, when combined with the input image, generates results with sharper and cleaner edges and details with limited or no ringing and halo artifacts and/or while suppressing noise boosting.

A high frequency image can be computed by determining each of multiple patches to be used in the high frequency image. A "patch" is a portion of an image comprised of one or more pixels that is less than all of the image. As examples, an input image can be divided into patches, e.g., 4 pixel×4 pixel or 5 pixel×5 pixel groups. For each patch of an input image, a corresponding high frequency image patch can be determined to be used to provide a patch update. As used herein the phrase "patch update" refers to a change for a sub-region of pixels of the image, for example, by adding values (positive or negative) to the intensity values of those pixels. In one embodiment, a high frequency image is created by accumulating patch updates.

In one embodiment, for each patch of the input image, a patch update is determined based on the input image and a blurred image created from the input image. The patch updates can be computed in ways that ultimately result in limited or no residual signals around important image structures such as edges. In some embodiments, local patch search and patch update techniques are used. Local patch search and patch update techniques can be used to reduce halos and ringing, for example, around high gradient areas. Unlike with high-frequency maps in which global differencing creates residual signals around important image structures due to the long-tailed nature of convolutions, local patch search and patch update techniques can be used to effectively reduce the residual signals by spatial adaptation, which consequently reduces the halo and ringing artifacts.

A local patch search can be used to search for a most similar patch in the patch's neighborhood in the blurred image. For example, in FIG. 1, an input image 10 has a patch at location 12 and the blurred image 20 has a patch at a corresponding location 22. Finding a most similar patch can involve observing patches within neighborhood 24 and comparing those patches from the blurred image 20 with the patch at location 12 in the input image 10. Similarity can be determined based on the similarity of the intensities of the respective patches.

Once the local patch search yields a location 26 of a most similar patch, a patch update can be computed using that location 26. This provides flexibility in contrast to, for example, rigid use of the patch at location 12 in the input image 10 and the patch at corresponding location 22 in the blurred image. Computing patch updates based on the results of such local patch search techniques can reduce residual signals in high gradient areas that would otherwise be present.

These exemplary techniques and discussion of potential benefits is provided to introduce rather than limit certain of the embodiments disclosed herein. Additional details regarding exemplary sharpening and image modification techniques are provided in the following discussion.

Sharpening Techniques

Exemplary sharpening techniques disclosed herein can be derived from the Richardson & Lucy (RL) non-blind deconvolution algorithm. In the RL algorithm, an input image $I_t$ is changed on each iteration, where $I_t$ is the input image at iteration t and where k is the blur kernel point spread function (PSF). The RL algorithm restores an image from its blurred initial version U by the following iterative process. After $I_0$ is initialized as $I_0=U$, the following formula is used to determine $I_{t+1}$, for t=1, 2 ... T:

$$I_{t+1} = I_t + k^* \otimes (U - I_t \otimes k)$$

When the above process converges, $U \approx I_t \otimes k$, which is the reconstruction constraint.

The above formulation of $I_{t+1}$ can be simplified by dropping the conjugate kernel weight $k^*$, i.e. $I_{t+1}=I_t+(U-B_t)$; where $B_t=I_t \otimes k$. $B_t$ is thus a blurred version of the already blurry input image $I_t$. The formulation can further be rewritten as $I_{t+1}=I_t+(U-I_t+D_t)=U+D_t$, where $D_t=I_t-B_t$.

In the above formulation, $D_t$ represents the difference between the input image and the blurred version of the input image. At locations in the image of singular structures (e.g. edges), $D_t$ is more "long-tailed" than $U-I_t$, i.e., the intensity value at the edge or other transition changes more gradually in $D_t$. This difference can result in the halo and ringing artifacts if exactly corresponding positions are used in the sharpening process.

Figure 2A:
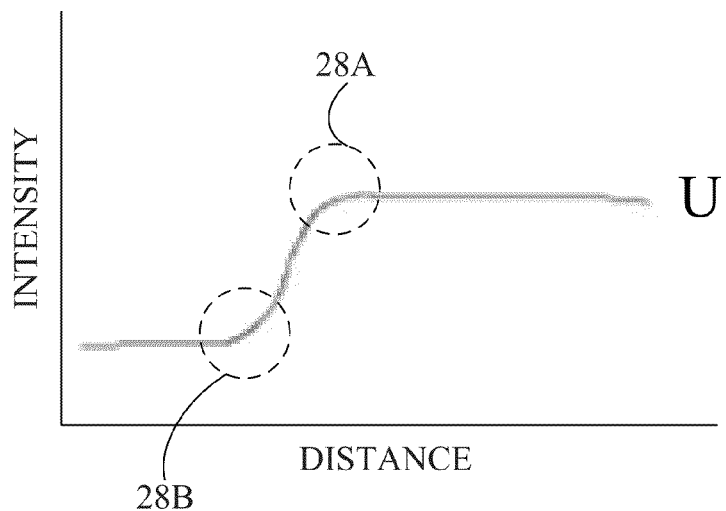
FIGS. 2A and 2B are charts illustrating differences in transition bands in an original input image and a blurred image.
Figure 2B:
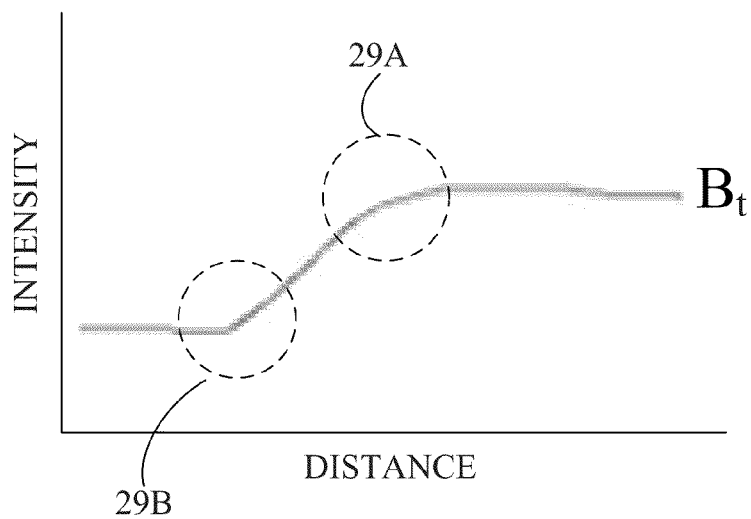

FIGS. 2A and 2B are charts illustrating differences in transition bands 28A, 28B in an original input image U and transition bands 29A, 29B in a blurred image $B_t$ with respect to a portion of the images that has a singular structure such as an edge. The larger the blur kernel, the longer the transition period in the blurred image $B_t$, i.e., the longer the tail. Because $D_t$ is based on $B_t$, it also has a relatively long tail length in comparison to $U-I_t$.

In order to reduce the tail length of $D_t$, and thus reduce the potential for halo and ringing artifacts, a local spatial adaptation f can be applied to $D_t$:

$$\hat{D}_t = f(D_t)$$

The computation of $I_{t+1}$ can thus be changed to:

$$I_{t+1} = I_t + (U - I_t + \hat{D}_t) = U + \hat{D}_t$$

Local spatial adaptation f can be applied to $D_t$ using a patch-based technique. In one embodiment, patch searching is performed in a small neighborhood region of the location of interest and $D_t$ is shifted locally (i.e. adapting it to local structures). For example, this may involve, for each patch in $I_t$ or U, finding the nearest patch in $B_t$ in a very, small local neighborhood (e.g., 5 to 9 patches) around the same image location corresponding to the center of the patch in $I_t$. In the above equation, high-frequency information is estimated from an example patch pair in ($I_t$, $B_t$) and added to U to obtain a prediction of a sharper version of $I_t$ that satisfies the reconstruction constraint $I_t \otimes k \approx U$. Patch searching can be based on patches in either U or $I_t$ with patches in a local neighborhood in $B_t$. However, using patches in $I_t$ as the source for the patch searching may generate more accurate results.

An exemplary sharpening algorithm based on the above exemplary technique determine $I_{t+1}$ as follows:

$$I_{t+1} = I_t + \alpha(U - I_t + \hat{D}_t)$$

The parameter α represents a "sharpen amount" ranging from 0 to 1.5 or even larger. Such a parameter may be controlled by a user. For example, a user using a photo editing application may select to apply sharpening and specify a particular sharpen amount to be used in the sharpening.

Figure 3:
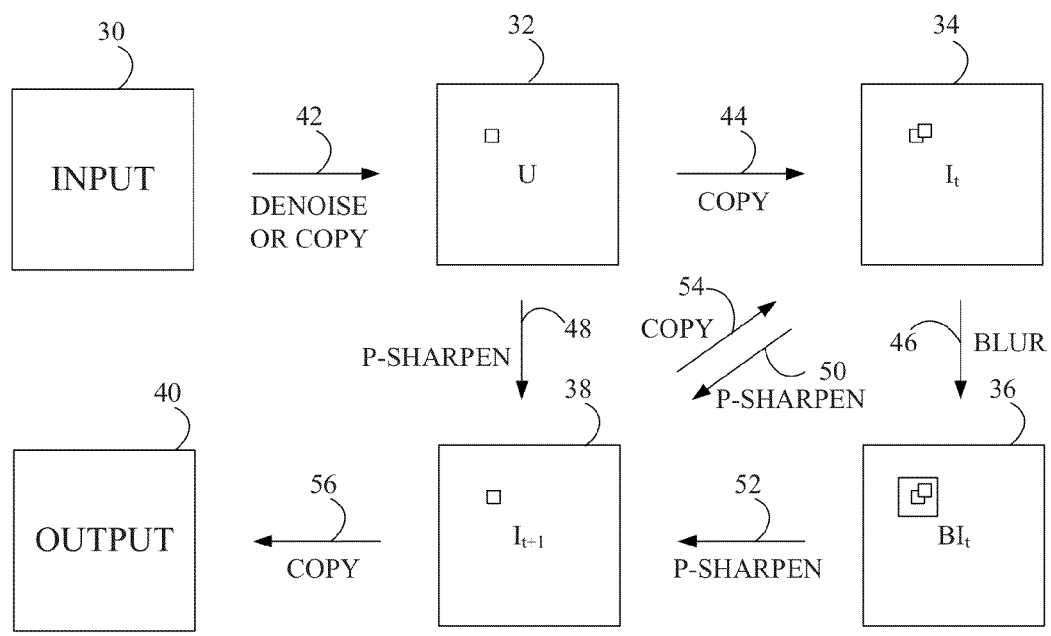
FIG. 3 is a modeling diagram illustrating an exemplary technique for sharpening an image.

FIG. 3 is a modeling diagram illustrating an exemplary technique for sharpening an image. The patch-sharpen (P-Sharpen) process is iteratively applied for T iterations (e.g., default is T=4) by using the result of the previous iteration as the input of the next iteration. When the blur kernel (or blur size for Gaussian and Lens blurs) is appropriate, this iterative process gradually recovers true image details because it is governed by an underlying signal reconstruction constraint.

FIG. 3 illustrates an exemplary sharpen algorithm. Such an algorithm may utilize one or more input parameters. An exemplary input parameter is a blur kernel k. A blur kernel, k, can be the blur kernel of the input image or sub-region of the input image which can be estimated using any blur kernel estimation algorithm or provided by a user. A blur kernel, k, can also be specified as radius for 2D symmetric Gaussian and lens blurs. Another exemplar input parameter is a sharpen amount, α, described above.

Steps of an exemplary sharpen algorithm illustrated in claim 1 may be performed via any suitable computing device. In FIG. 3, an input 30 is received and denoised and/or copied in step 42 to provide original image (U) 32. The input 30 may be any electronic image or video. Denoising can be applied to avoid boosting noise and compression artifacts during the sharpening process.

To begin the first iteration, the original image (U) 32 is copied to provide input image ($I_t$) 34 in step 44. In step 46, the image ($I_t$) 34 is blurred to produce a blurred image ($B_t$) 36. For example, this may involve applying a blur with blur kernel, k, to image $I_t$ to produce the blurred image. As examples, the kernel k may be a 2D Gaussian kernel (with radius) for removing a symmetric 2D Gaussian blur, a 2D lens blur kernel (with the given radius) for removing a symmetric 2D lens blur, or a 1D motion blur (with length r, and an angle θ) for removing a 1D motion blur. More general blur kernels such as non-symmetric blur kernels or 2D motion blur kernel may also be used.

Next, a patch sharpen (P-Sharpen) procedure is employed using information from (U) 32, ($I_t$) 34, and ($B_t$) 36, represented by arrows 48, 50, and 52, respectively.

Figure 4:
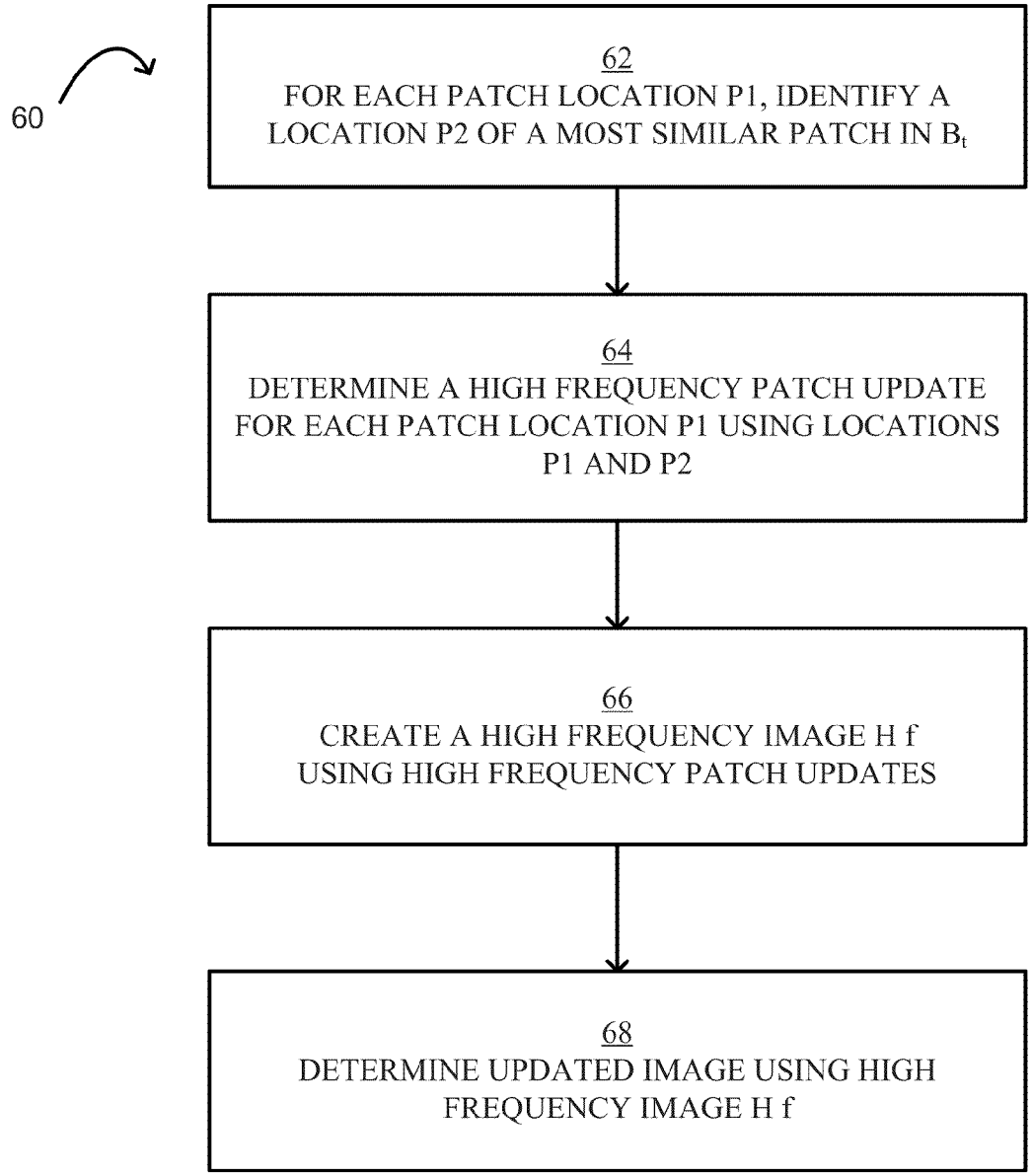
FIG. 4 is a flow chart illustrating an exemplary method for patch sharpening.

FIG. 4 illustrates an exemplary P-Sharpen procedure 60 using local spatial adaptation to reduce transition bands at singular image structures. The P-Sharpen procedure 60 involves determining local neighborhood positions and computing patch updates, as shown in bock 62. For example, for each patch location (p1) in image ($I_t$) 34 the procedure may search for the most similar patch in ($B_t$) 36 around a small neighborhood at the corresponding location, i.e., at p1 in ($B_t$) 36. The location (p2) of the most similar patch can be determined by finding a position p in the local neighborhood of p1, such that $\|I_t(p1) - Bt(p)\|$ is minimized, where $I_t(p1)$ is the intensity of It at location p1 and Bt(p) is the intensity of $B_t$ at location p.

The P-Sharpen procedure 60 further involves using the patch location (p1) and location (p2) of the most similar patch to determine a high frequency patch update, as shown in FIG. 4 block 64. In one exemplary embodiment, this involves determining a high frequency patch update for each location (p1) of image ($I_t$) according to the following formula:

$$Hf(p1) = I_t(p2) - B_t(p2) + U(p1) - I_t(p1)$$

The exemplary P-Sharpen procedure 60 further involves creating a high frequency image Hf using the high frequency patch updates, as shown in block 66. For example, this may involve accumulating each high-frequency patch prediction Hf(p1) to high-frequency image Hf for all overlapping patches and then averaging overlapping values to obtain a final Hf.

The exemplary P-Sharpen procedure 60 further involves determining an updated image using the high frequency image Hf as shown in block 68. For example, the updated image may be computed by adding the high frequency image to the input image. In one embodiment, this involves multiplying the high frequency image by a sharpen amount, α, according to the following formula:

$$I_{t+1} = I_t + \alpha Hf$$

The sharpen amount used may have any suitable value and may be preset, provided by a user, or automatically determined by the application. Exemplary values of a sharpen amount range from 0 to 500 percent.

The local patch search and patch update procedures are employed to reduce halos and ringing around high gradient areas. Previous sharpening methods involved global operations where high-frequency maps are computed by subtracting from an image a blurred version of it. Due to the long-tailed nature of convolutions, this global differencing creates residual signals around important image structures (such as edges), which eventually causes either halo or ringing artifacts. Using local patch search and patch update procedures can effectively reduce the residual signals by spatial adaptation, which consequently reduces the halo and ringing artifacts.

The result of a patch sharpen procedure 60 provides a modified input image. Returning to FIG. 3, after a patch sharpen P-Sharpen procedure is employed using information from (U) 32, ($I_t$) 34, and ($B_t$) 36, represented by arrows 48, 50, and 52, respectively, as shown by arrow 54, a copy of $I_{t+1}$ can be provided from block 38 to 34 to be used in the next iteration, i.e., $I_t$ t of the next iteration can be set to the $I_{t+1}$ of the prior iteration. The blurring, patch search, and P-sharpen procedures can be repeated any number of times. These procedures may also involve parallel processing, for example, in multi-threaded implementations and graphics processing unit (GPU) implementations. The number of repeats can be preset, specified by a user, or automatically determined by the application. It has been found that repeating 3 or 4 times produces desirable results in some circumstances. Increasing the number of iterations, T, generally results in improved detail retention. Once the final iteration is run, the determined $I_{t+1}$ of the last iteration can be provided as output 40 for example by copy operation 56.

Figure 5:
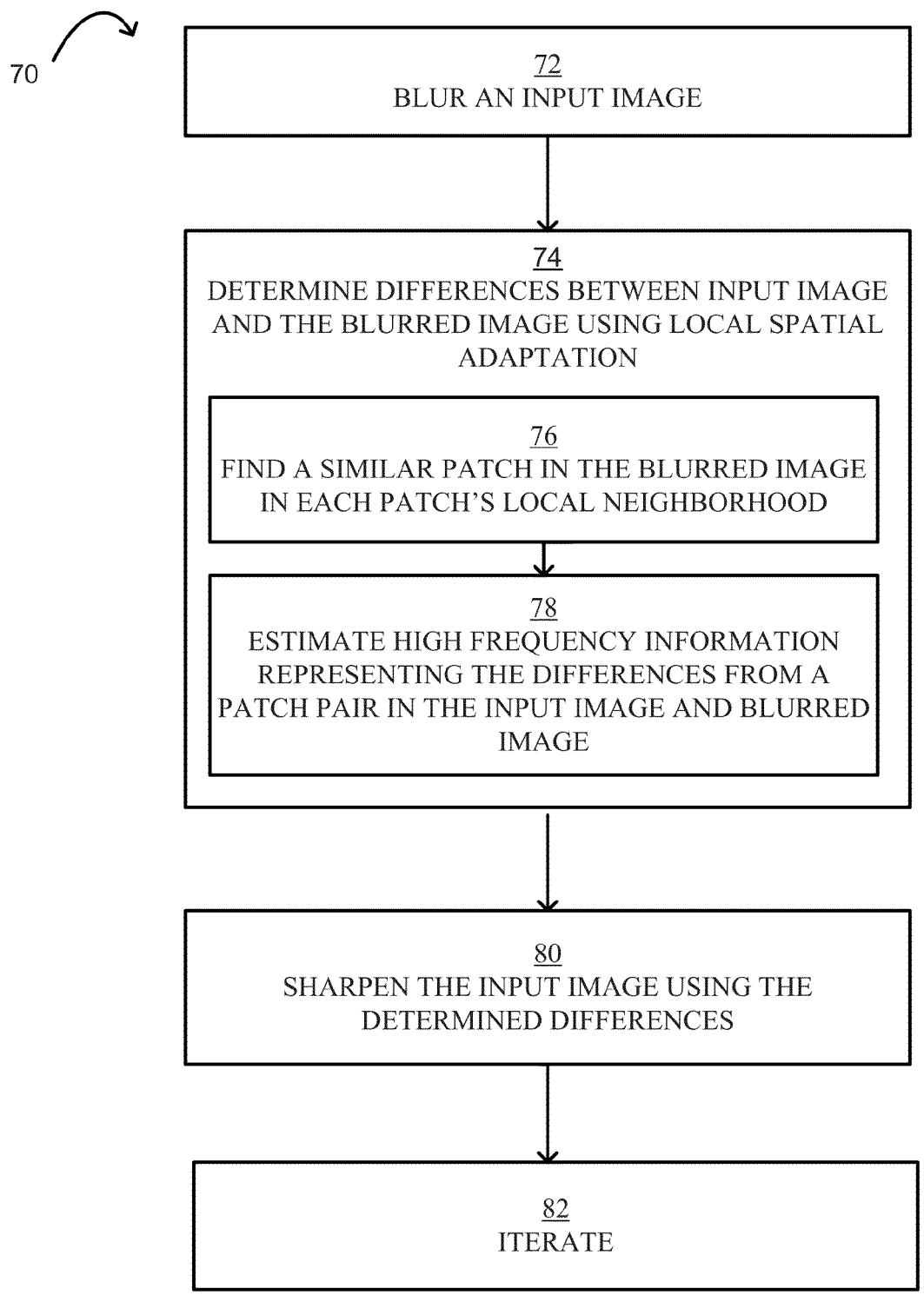
FIG. 5 is a flow chart illustrating an exemplary method of sharpening an image.
Figure 6A:
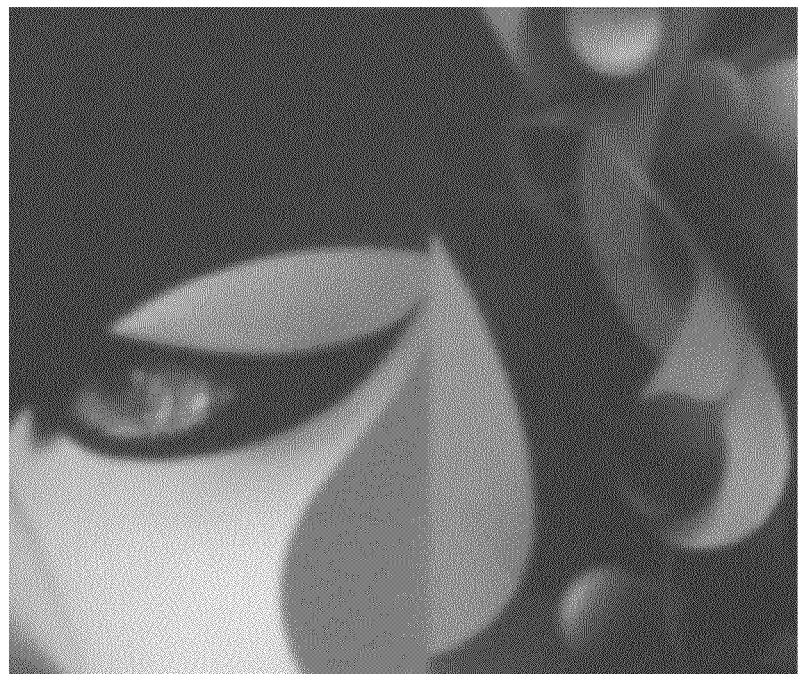
FIGS. 6a-c depict an original image, the original image sharpened using a conventional sharpening technique, and the original image sharpened using a sharpening technique that involves local spatial adaptation.
Figure 6B:
Figure 6C:
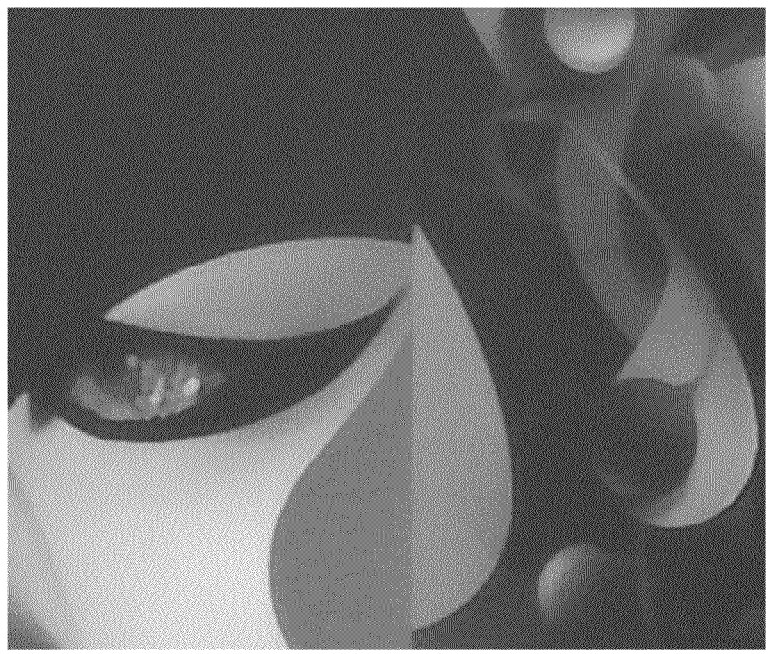
Figure 7A:
FIGS. 7a-c depict an original image, the original image sharpened using a conventional sharpening technique, and the original image sharpened using a sharpening technique that involves local spatial adaptation.
Figure 7B:
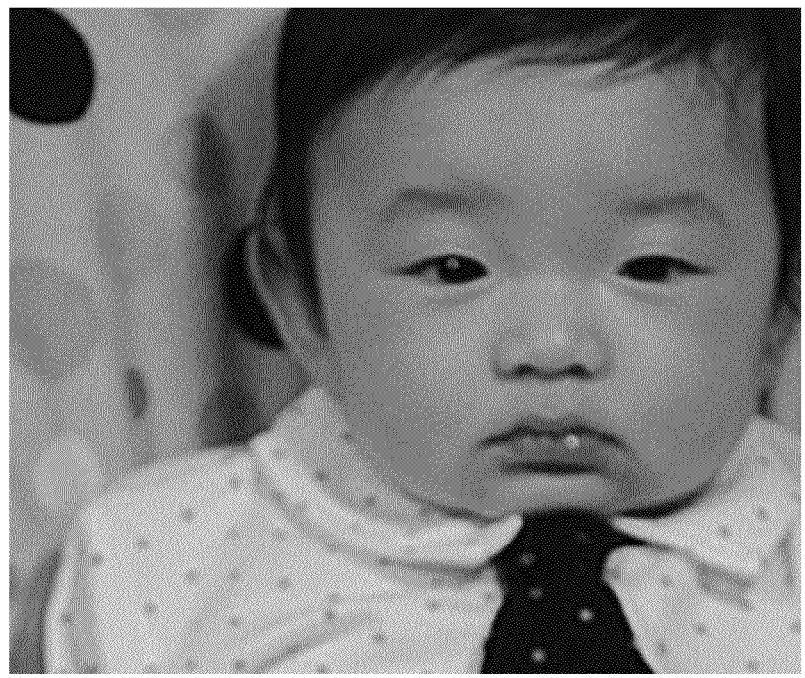
Figure 7C:
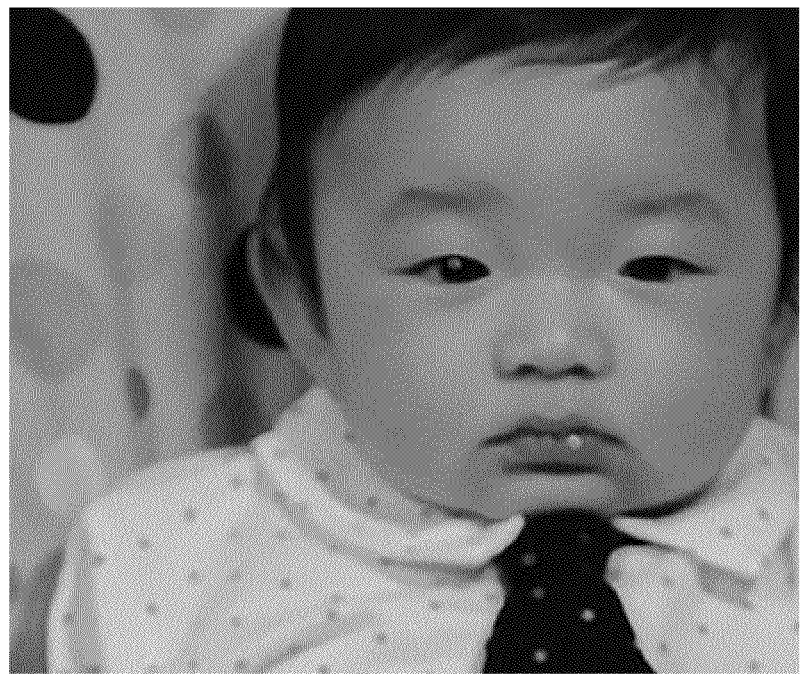
Figure 8A:
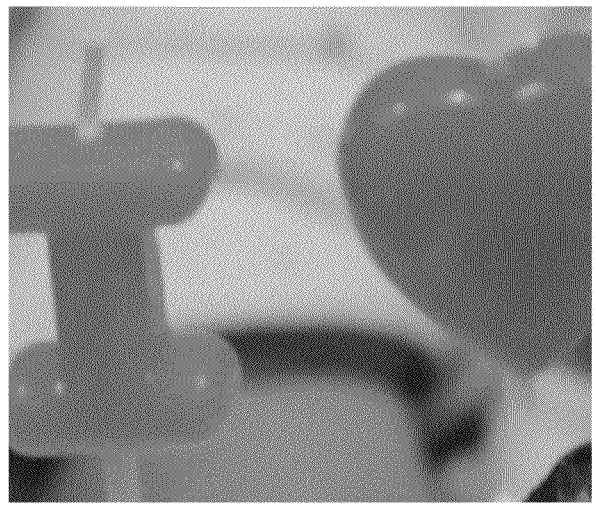
FIGS. 8a-c depicts an original image, the original image sharpened using a conventional sharpening technique, and the original image sharpened using a sharpening technique that involves local spatial adaptation.
Figure 8B:
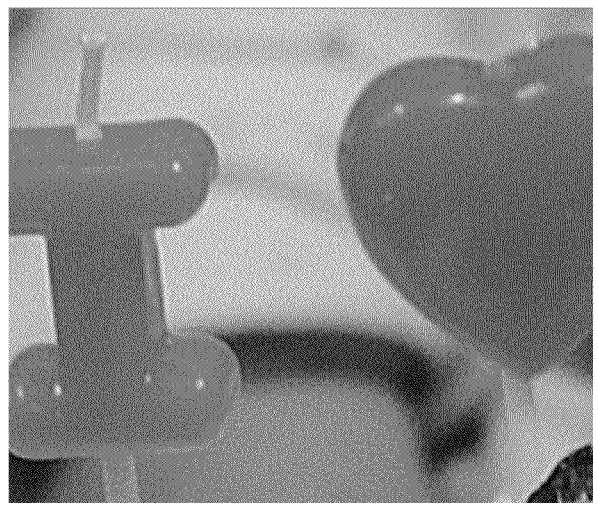
Figure 8C:
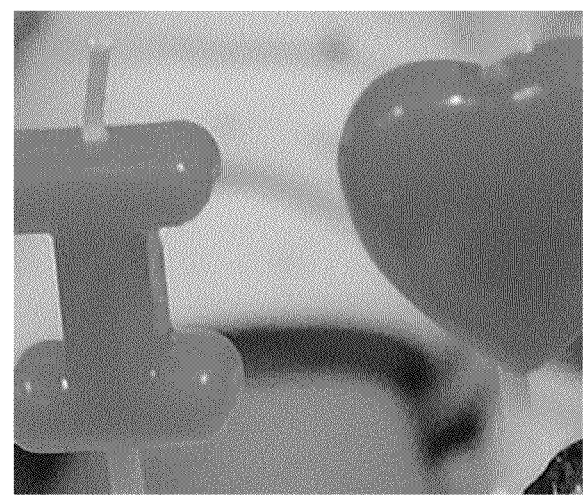
Figure 9A:
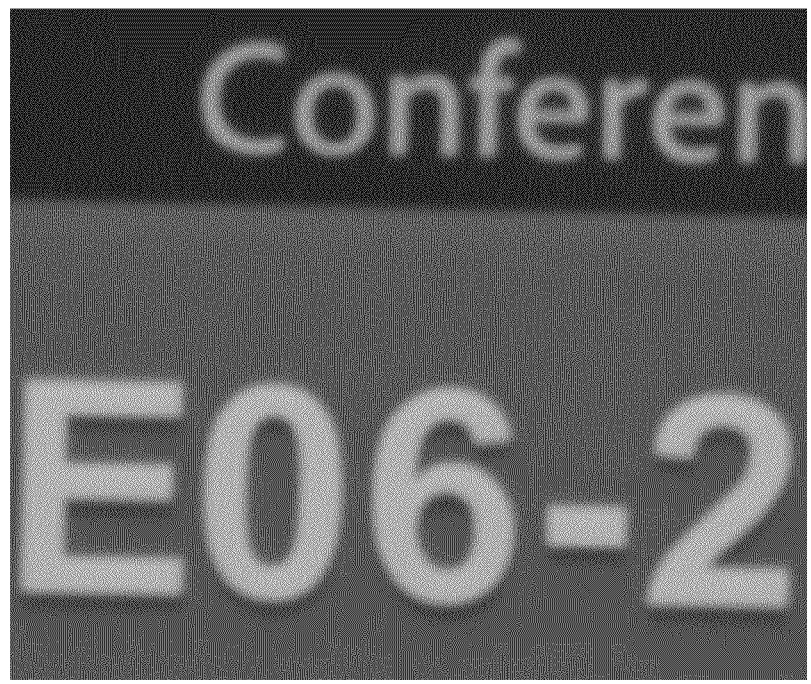
FIGS. 9a-c depicts an original image, the original image sharpened using a conventional sharpening technique, and the original image sharpened using a sharpening technique that involves local spatial adaptation.
Figure 9B:
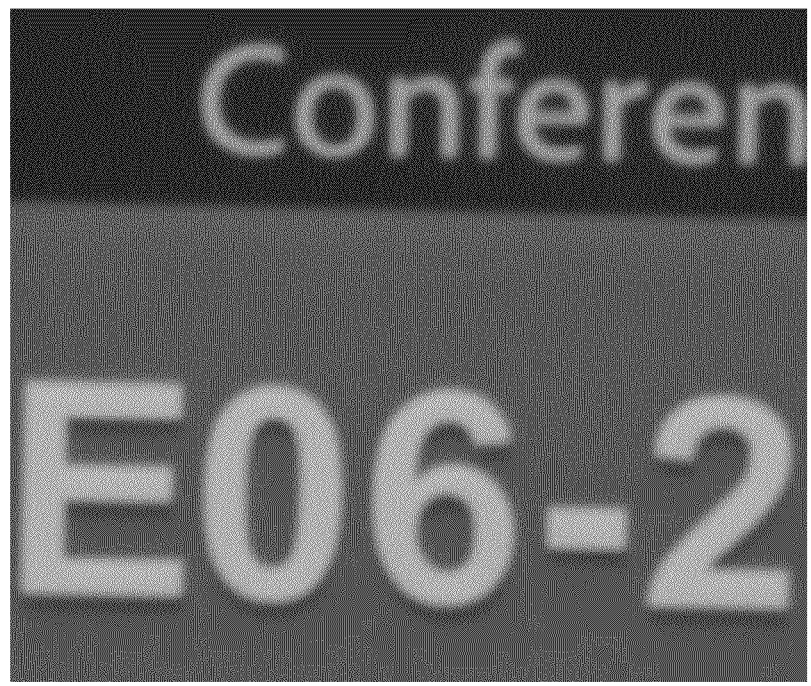
Figure 9C:
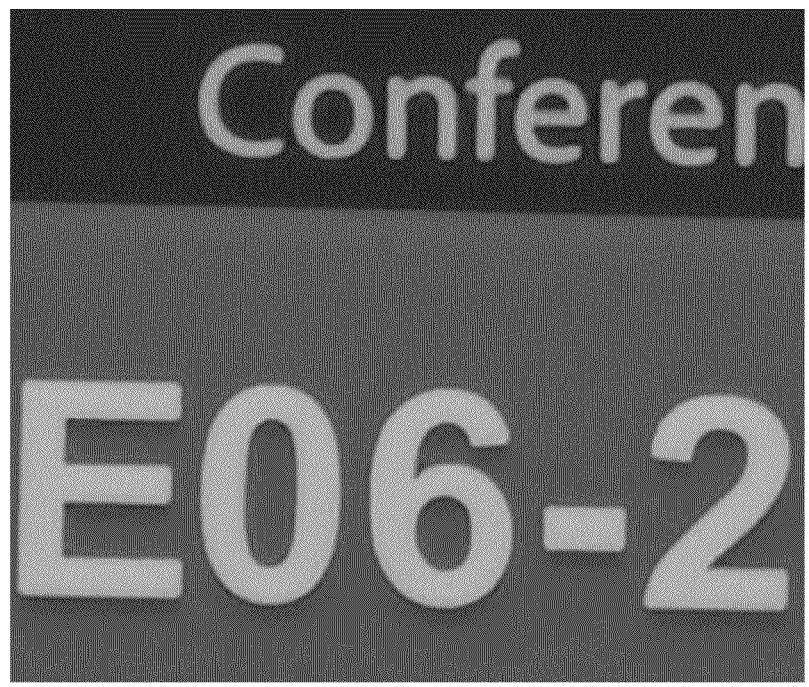

FIG. 5 is a flow chart illustrating an exemplary method 70 of sharpening an image. The exemplary method 70 may be performed by any suitable computing device and/or application. For example, exemplary method 70 could be performed by image editing module 216 of computing system 202 of FIG. 10.

Exemplary method 70 involves blurring an input image, as shown in block 72. Blurring an input image can involve any type of blurring technique. In addition, different portions of the image can be blurred using different blurring techniques. The blurring technique used may be preset, selected by a user, or automatically determined for example based upon an analysis of the input image.

The exemplary method 70 further involves determining differences between the input image and the blurred image using local spatial adaptations, as shown in block 74. The use of local spatial adaptation may reduce transition bands at singular image structures.

The local spatial adaptation may comprise a patch-based technique that involves finding a similar patch in the blurred image in each patch's local neighborhood, as shown in block 76. For example, this may involve finding a similar patch in the blurred image in a local neighborhood around a same image location corresponding to a center of a patch in the input image.

The local spatial adaptation may further comprise estimating high frequency information representing the differences from a patch pair in the input image and blurred image, as shown in block 78.

Determining the differences may involve computing a high frequency image by computing patch updates using the blurred image and accumulating the patch updates to the high frequency image. Determining the differences may involve computing each respective patch update using a first location of a respective patch and a second location of a similar patch, wherein the second location is a location of a patch in the blurred image within a predefined proximity to a corresponding location in the blurred image that is most similar in intensity to the respective patch in the input image, wherein the corresponding location in the blurred image corresponds to the first location in the input image.

Computing the respective patch update may involve using a first intensity of the input image at the second location, a second intensity of the blurred image at the second location, a third intensity of an original image at the first location, wherein the input image is based on the original image; and a fourth intensity of input image at the first location. For example, it may involve computing the respective patch update comprises determining: $I_t(p2)-B_t(p2)+U(p1)-I_t(p1)$, where $I_t(p2)$ is a first intensity of the input image at the second location, $B_t(p2)$ is a second intensity of the blurred image at the second location, $U(p1)$ is a third intensity of an original image at the first location, wherein the input image is based on the original image, and $I_t(p1)$ is a fourth intensity of the input image at the first location.

The exemplary method 70 further involves sharpening the input image using the determined differences between the input image and the blurred image, as shown in block 80. This may involve using the high frequency information to obtain a sharper version of the input image.

In block 82, the exemplary method 70 iterates a number of times. In each of the additional iterations, the sharpened image from the prior iteration is used as the input image. The number of iterations may be preset, user specified, or automatically determined based on the characteristics of the image.

Another embodiment provides a mechanism for handling structure distortions. In searching for the most similar patch locally, more weight can be put on the center (in-place) patch in order to preserve image structures (preventing structure distortion, e.g. distorting straight lines into curvy lines). This can be done by estimating p2 as the position p in the local neighborhood of p1, such that $\|I_t(p1)-B_t(p)\|$ is minimized. Next, d1 is computed as $\|It(p1)-Bt(p1)\|$ and d2 is computed as $\|I_t(p1)-B_t(p2)\|$. If the $\gamma=d2/d1>\tau$, where $\tau$ is a threshold, e.g. 0.7), update p2←p1. For example, when the ratio $\gamma$ is large, p1 is relatively a good match, so choose p1 with more preference. This process can be very effective in minimizing structure distortion in the sharpened result, particularly for areas with low contrast edges or textures. Alternatively, the above distortion removal task can also be done in a soft way by a weighted combination of patch update at p1 and p2 based on a patch content metric or measure. Then, instead of assigning p1 to p2 by hard thresholding with $\tau$ as above, the patch update (P-Sharpen) can be changed to:

$$Hf(p1)=(1-\beta)(It(p2)-Bt(p2))+\beta(It(p1)-Bt(p1))+U(p1)-It(p1)$$

where $\beta$ can be set to $\beta=\tau$ or $\beta=g(\gamma)$, where g is a 1D mapping function.

Another embodiment addresses variations for different color spaces and color channels. This may involve applying a sharpen algorithm only on the luminance channel Y. The result can be combined with the Cb and Cr channels. Sharpen algorithms can be applied to each color channels (R; G; B) or other color spaces independently. The sharpen algorithms can be applied to one or multiple color channels jointly (by searching for the nearest patches with all color spaces), and apply sharpening consistently for different color spaces using the patch search results.

Embodiments can address noise removal. In one embodiment, when the input image is not only blurry but also with some noise, the above sharpening algorithm will bring up the noise in the result. For noisy images, an adaptive denoising operation can be performed prior to the sharpen algorithm. The denoising can be any appropriate algorithm including, but not limited to, non-local means. BM3D, or sparse coding-based approaches. Given input parameters ($\sigma$ noise; k; $\alpha$), where $\sigma$ noise is an optional parameter indicating the underlying noise variance, k and $\alpha$ are as defined previously discussed.

Embodiments can relate to selectively sharpening particular portions of an image or video. A sharpen algorithm can be used selectively on sub-region or sub-part of images or videos. Doing so can provide various benefits. For example, different image regions may be sharpened using different parameters (e.g. adaptive radius, amount, denoise amount, etc.). Those region-specific parameters can be estimated automatically using existing blur or noise estimation algorithms. For videos, the sharpening parameters can be tuned on one representative frame, and the algorithm can be applied independently for all the frames to generate the sharpened video result.

The sharpening techniques discussed above can be modified and/or enhanced to apply to image and video upscaling and super-resolution. For example, a deblurring/sharpening approach can be directly applied to image and video super-resolution by applying the sharpening algorithm to the bicubic-interpolated upscaled images using a fixed parameter set learned offline. During an offline stage, for each possible upscale factor, the system may learn the optimal radius or size of blur kernel either automatically or empirically. This will model the blur radius as a function of the upscale factor. The sharpening amount can be fixed to be a fixed value (e.g., 1.5), or it can be estimated through a learning process or a cross-validation process. An inputted low-resolution or other image may be upsampled and sharpened using a scale factor. Upsampling can use the scale factor S using bicubic interpolation or other upsampling methods such as the Lanczos filter, or for video, an upsampled result may be produced by merging multiple frames of a video. The sharpening may involve running a sharpening algorithm using the default 2D Gaussian or Lens blur kernel with the parameter set to the offline learned/designed parameter values. Bicubic interpolation with a large upscaling factor typically would cause jaggy artifacts around edges or structure artifacts, which may be more pronounced when we apply additional sharpening. For large upscaling factors, upsampling the image can be performed iteratively with a set of small upsampling factors (e.g., 1.5), and the sharpening algorithm applied after each upsampling iteration, i.e. interleaving upscaling and sharpening in an iterative process. An exemplary algorithm comprises (a) initialize $I_0=I$ and for $t=0, 1 \ldots$ (b) upsampling the current input image It with a small scale factor $st<2$ using bicubic interpolation or other upsampling methods, (c) running the proposed sharpening algorithm using the default 2D Gaussian or Lens blur kernel with the parameter set to the offline learned/designed parameter values corresponding to st, (d) assigning the sharpened result to It+1, and (e) breaking if the current image size is larger than the target image size.

FIGS. 6a, 7a, 8a, and 9a each depicts an original image. FIGS. 6b, 7b, 8b, and 9b each depicts the respective original image from FIGS. 6a, 7a, 8a, and 9a sharpened using a conventional sharpening technique. FIGS. 6c, 7c, 8c, and 9c each depicts the respective original image from FIGS. 6a, 7a, 8a, and 9a sharpened using a sharpening technique that involves a local spatial adaptation technique of at least one embodiment of the present disclosure. As can be seen from these Figures, sharpening according to a local spatial adaptation-based technique can provide an improved appearance in comparison to sharpening according to a conventional technique.

Figure 10:
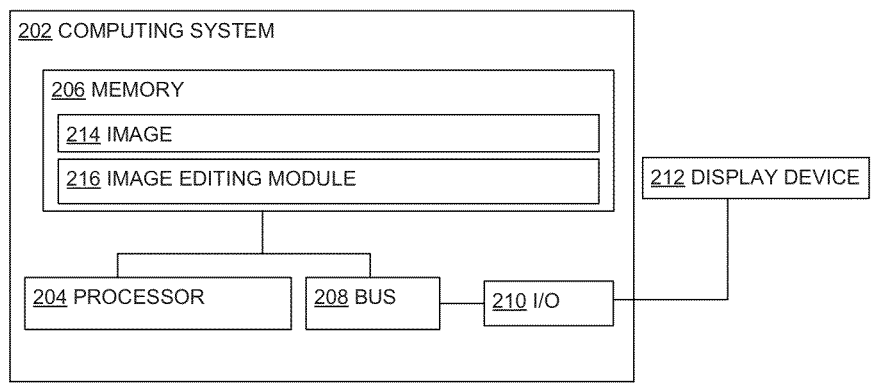
FIG. 10 is a block diagram depicting an example computing system for implementing certain embodiments.

FIG. 10 is a block diagram depicting an example computing system 202 for implementing certain embodiments.

The computing system 202 comprises a processor 204 that is communicatively coupled to a computer-readable medium such as memory 206 and that executes computer-executable program instructions and/or accesses information stored in the memory 206. The processor 204 may comprise a microprocessor, an application-specific integrated circuit ("ASIC"), a state machine, or other processing device. The processor 204 can include any of a number of computer processing devices, including one processing device. Such a processor can include or may be in communication with a computer-readable medium storing instructions that, when executed by the processor 204, cause the processor to perform the steps described herein.

The computing system 202 may also comprise a number of external or internal devices such as input or output devices. For example, the computing system 202 is shown with an input/output ("I/O") interface 210 and a display device 212. A bus 208 can also be included in the computing system 202. The bus 208 can communicatively couple one or more components of the computing system 202.

The computing system 202 can modify, access, or otherwise use image 214. The image 214 may be resident in any suitable computer-readable medium. In one embodiment, the image 214 can reside in the memory 206 at the computing system 202. In another embodiment, the image 214 can be accessed by the computing system 202 from a remote content provider via a data network.

The memory 206 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

An image editing module 216 stored in the memory 206 can configure the processor 204 to perform operations on image 214. In some embodiments, the image editing module 216 can be a software module included in or accessible by a separate application (such as but not limited to, a browser application) executed by the processor 204 that is configured to display, modify, access, or otherwise use the image 214. In other embodiments, the image editing module 216 can be a stand-alone application executed by the processor 204.

The computing system 202 can include any suitable computing device for executing the image editing module 216. Non-limiting examples of a computing device include a desktop computer, a tablet computer, a smart phone, a digital camera, or any other computing device suitable for editing the image 214. The computing system 202 may be a touch-screen enabled device.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
blurring an input image to obtain a blurred image;
determining, via a processor, differences between the input image and the blurred image, wherein a difference of the determined differences is determined based on an input image patch in the input image and a blurred image patch in the blurred image, wherein the input image patch and the blurred image patch are not located at corresponding locations in the input image and blurred image; and
sharpening the input image using the determined differences between the input image and the blurred image.

2. The method of claim 1 wherein determining the differences comprises: identifying the blurred image patch by searching, in a local neighborhood in the blurred image around a location corresponding to the input image patch, for a patch most similar to the input image patch.

3. A method of claim 1 wherein determining the differences comprises computing a high frequency image by:
computing patch updates using the blurred image, wherein each of the patch updates is computed for a respective patch of the input image; and
accumulating the patch updates to the high frequency image.

4. The method of claim 1 wherein determining the differences comprises computing a high frequency image by computing patch updates using the blurred image, wherein each of the patch updates is computed for a respective patch of the input image, wherein each respective patch update is computed using a first location of the respective patch and a second location of a similar patch, wherein computing the respective patch update comprises using:
a first intensity of the input image at the second location;
a second intensity of the blurred image at the second location;
a third intensity of an original image at the first location, wherein the input image is based on the original image; and
a fourth intensity of the input image at the first location.

5. The method of claim 1 wherein determining the differences comprises computing a high frequency image by computing patch updates using the blurred image, wherein each respective patch update is computed using a first location of the respective patch and a second location of a similar patch, wherein computing the respective patch update comprises determining : $I_t(p2) - B_t(p2) + U(p1) - I_t(p1)$, wherein:
$I_t(p2)$ is a first intensity of the input image at the second location;
$B_t(p2)$ is a second intensity of the blurred image at the second location;
$U(p1)$ is a third intensity of an original image at the first location, wherein the input image is based on the original image; and
$I_t(p1)$ is a fourth intensity of the input image at the first location.

6. The method of claim 1 wherein determining the differences comprises computing a high frequency image by computing patch updates using the blurred image, wherein each respective patch update is computed using a first location of the respective patch and a second location of a similar patch, wherein the second location is a location of a patch in the blurred image within a predefined proximity to a corresponding location in the blurred image that is most similar in intensity to the respective patch in the input image, wherein the corresponding location in the blurred image corresponds to the first location in the input image.

7. The method of claim 1 further comprising performing additional iterations of sharpening, wherein, in each of the additional iterations, the sharpened image from the prior iteration is used as the input image.

8. The method of claim 1 wherein a denoising filter is applied to the input image prior to the sharpening.

9. The method of claim 1, wherein blurring the input image to obtain the blurred image comprises using a kernel, wherein the kernel is one of:
a 2D Guassian kernel for removing a symmetric 2D Gaussian blur;
a 2D lens blur kernel for removing a symmetric 2D lens blur; and
a 1D motion blur for removing a 1D motion blur.

10. A method comprising:
blurring an input image to obtain a blurred image;
computing, via a processor, patch updates using the blurred image, wherein each of the patch updates is computed for a respective patch of the input image, wherein each respective patch update is computed using a first location of the respective patch and a second location of a similar patch, wherein the first location and second location are different;
accumulating the patch updates to a high frequency image; and
computing a sharpened image using the high frequency image.

11. The method of claim 10 wherein computing the respective patch update comprises using an intensity value at the second location in the input image or at the second location in the blurred image.

12. The method of claim 10 wherein computing the respective patch update comprises computing a difference in intensity between the input image and the blurred image at the second location.

13. The method of claim 10 wherein computing the respective patch update comprises computing a difference in intensity between the input image and the blurred image at the second location and computing a difference in intensity at the first location between the original image and the input image.

14. The method of claim 10 wherein computing the respective patch update comprises using:
a first intensity of the input image at the second location;
a second intensity of the blurred image at the second location;
a third intensity of an original image at the first location, wherein the input image is based on the original image; and
a fourth intensity of input image at the first location.

15. The method of claim 10 wherein computing the respective patch update comprises determining : $I_t(p2) - B_t(p2) + U(p1) - I_t(p1)$, wherein:
$I_t(p2)$ is a first intensity of the input image at the second location;
$B_t(p2)$ is a second intensity of the blurred image at the second location;
$U(p1)$ is a third intensity of an original image at the first location, wherein the input image is based on the original image; and
$I_t(p1)$ is a fourth intensity of the input image at the first location.

16. The method of claim 10 further comprising performing additional iterations of sharpening, wherein, in each of the additional iterations, the sharpened image from the prior iteration is used as the input image.

17. The method of claim 10 further comprising obtaining a high frequency value for all image positions by computing patch updates for all image positions and averaging overlapping patch updates.

18. The method of claim 10 wherein computing the sharpened image using the high frequency image comprises adding to the input image the high frequency image adjusted by a sharpen amount.

19. A method comprising:
blurring an input image to obtain a blurred image;
computing, via a processor, patch updates using the blurred image, wherein each of the patch updates is computed for a respective patch of the input image, wherein each respective patch update is computed using a first location of the respective patch and a second location of a similar patch, wherein computing the respective patch update comprises using at least one intensity value at the second location to reduce a halo or a ringing artifact;
accumulating the patch updates to a high frequency image; and
computing a sharpened image using the high frequency image.

20. A method comprising:
blurring an input image to obtain a blurred image;
computing, via a processor, patch updates using the blurred image, wherein each of the patch updates is computed for a respective patch of the input image, wherein each respective patch update is computed using a first location of the respective patch and a second location of a similar patch, wherein the second location is a location of a patch in the blurred image within a predefined proximity to a corresponding location in the blurred image that is most similar in intensity to the respective patch in the input image, wherein the corresponding location in the blurred image corresponds to the first location in the input image;
accumulating the patch updates to a high frequency image; and
computing a sharpened image using the high frequency image.

21. A system comprising:
a processor;
a non-transitory computer readable medium storing instructions which, when executed by the processor, perform operations comprising:
blurring an input image to obtain a blurred image;
determining differences between the input image and the blurred image, wherein a difference of the determined differences is determined based on an input image patch in the input image and a blurred image patch in the blurred image, wherein the input image patch and the blurred image patch are not located at corresponding locations in the input image and blurred image; and
sharpening the input image using the determined differences between the input image and the blurred image.

22. The system of claim 21 wherein determining the differences comprising: identifying the blurred image patch by searching, in a local neighborhood in the blurred image around a location corresponding to the input image patch, for a patch most similar to the input image patch.

* * * * *